(12) United States Patent
Peters et al.

(10) Patent No.: US 12,018,794 B2
(45) Date of Patent: Jun. 25, 2024

(54) WHEEL CLAMP

(71) Applicant: BEISSBARTH AUTOMOTIVE TESTING SOLUTIONS GMBH, Munich (DE)

(72) Inventors: Stefanie Peters, Darmstadt (DE); Trendafil Ilchev, Munich (DE); Christian Wagmann, Munich (DE); Claudia Hofmann, Munich (DE)

(73) Assignee: Beissbarth Automotive Testing Solutions GmbH, Munich (DE)

( * ) Notice: Subject to any disclaimer, the term of this patent is extended or adjusted under 35 U.S.C. 154(b) by 519 days.

(21) Appl. No.: 17/273,777

(22) PCT Filed: Aug. 22, 2019

(86) PCT No.: PCT/EP2019/072438
§ 371 (c)(1),
(2) Date: Mar. 5, 2021

(87) PCT Pub. No.: WO2020/048780
PCT Pub. Date: Mar. 12, 2020

(65) Prior Publication Data
US 2021/0317947 A1    Oct. 14, 2021

(30) Foreign Application Priority Data
Sep. 6, 2018  (DE) ..................... 10 2018 215 157.1

(51) Int. Cl.
*F16M 13/00* (2006.01)
*F16M 13/02* (2006.01)
*G01B 21/26* (2006.01)

(52) U.S. Cl.
CPC ............. *F16M 13/02* (2013.01); *G01B 21/26* (2013.01); *G01B 2210/10* (2013.01)

(58) Field of Classification Search
None
See application file for complete search history.

(56) References Cited

U.S. PATENT DOCUMENTS

2012/0313334 A1* 12/2012 Hartman ................. B60S 13/00
  280/3
2014/0115906 A1*  5/2014 Pruitt ..................... G01B 5/255
  33/203.18

(Continued)

FOREIGN PATENT DOCUMENTS

DE         10242536 B3 *  4/2004 ............. G01B 5/255
DE    102019113128 A1 * 11/2020 ............. B60B 30/00

(Continued)

*Primary Examiner* — Steven M Marsh
(74) *Attorney, Agent, or Firm* — Wiggin and Dana LLP

(57) ABSTRACT

A wheel clamp (2) for fastening to a wheel (1), in particular to a wheel (1) of a motor vehicle, comprises at least two arms (22, 23, 24) which extend outward from a center (28) of the wheel clamp (2) in a radial direction, and a central rotary element (40) which is rotatably arranged in the center (28) of the wheel clamp (2). Each arm (22, 23, 24) has at least one movable element (32, 33, 34) which is movable in the radial direction in order to permit varying the length of the arm (22, 23, 24) in the radial direction. The wheel clamp (2) comprises furthermore at least two coupling elements (52, 53, 54) which each extend between one of the movable elements (32, 33, 34) and the central rotary element (40) such that the movable elements (32, 33, 34) are movable in the radial direction by rotation of the rotary element (40).

18 Claims, 4 Drawing Sheets

(56) References Cited

U.S. PATENT DOCUMENTS

2018/0347974 A1* 12/2018 Ferrari .................. G01B 21/26
2022/0212497 A1* 7/2022 Hofmann ................ B60B 30/02

FOREIGN PATENT DOCUMENTS

WO    WO-2020048780 A1 * 3/2020 ............. F16M 13/02
WO    WO-2020234116 A1 * 11/2020 ............. B60B 30/02

* cited by examiner

WHEEL CLAMP

CROSS-REFERENCE TO RELATED APPLICATIONS

This application is a national phase entry under 35 U.S.C. § 371 of International Application PCT/EP2019/072438, filed Aug. 22, 2019, which claims the benefit under 35 U.S.C. § 119 of German Application No. 10 2018 215 157.1, filed Sep. 6, 2018, all of which are herein incorporated by reference in their entireties.

The invention relates to a wheel holder or wheel clamp, in particular a wheel clamp for vehicle wheel alignment measurements, and to a method of mounting such a wheel clamp to a wheel of a vehicle, in particular a motor vehicle.

PRIOR ART

For vehicle wheel alignment measurements, there are often mounted wheel clamps, which are adapted to support sensors and/or measurement marks ("targets"), on the wheels of the vehicle to be measured for wheel alignment. The handling of such wheel clamps, in particular the attaching and detaching thereof to and from the wheels of the vehicle, is complex and difficult. In particular, there are several working steps required that have to be carried out using two hands. There is a risk that the measurement results of the wheel alignment measurement will be falsified by incorrect and/or inaccurate attachment of the wheel clamps.

It is an object of the invention to simplify attaching and detaching of a wheel clamp to and from the wheels of a vehicle and to reduce the risk of incorrect and/or inaccurate attachment.

DISCLOSURE OF THE INVENTION

According to one embodiment of the invention, a wheel clamp for fastening to a wheel, in particular to a wheel of a motor vehicle, comprises at least two arms which extend outward from a center of the wheel clamp in a radial direction, and a central rotary element which is arranged rotatably in the center of the wheel clamp. Each arm has at least one movable element that is movable in the radial direction so that the length of each arm in the radial direction can be varied by moving the movable elements. The wheel clamp comprises furthermore at least two coupling elements each extending between one of the movable elements and the central rotary element such that the movable elements can be moved in the radial direction by rotation of the rotary element.

Embodiments of the invention also comprise a method of mounting a wheel clamp according to an embodiment of the invention on a wheel, in particular a wheel of a motor vehicle. The method comprises the steps of moving the movable elements outward in the radial direction in order to increase the arm lengths of the arms; applying the wheel clamp to a wheel, in particular a wheel of a motor vehicle; and moving the movable elements toward the center by rotating the rotary element so as to reduce the arm lengths of the arms and thereby fix the wheel clamp to the wheel.

The length of the arms of a wheel clamp according to an embodiment of the invention can be varied simply by rotating the central rotary element in order to fix the wheel clamp to a wheel or release it from the wheel. The handling of the wheel clamp can thereby be considerably simplified. A wheel clamp according to the invention thus can be aligned on the wheel, in particular centered on the wheel axis, with high accuracy. A wheel clamp according to the invention is equally suitable for right and left-handers.

In one embodiment, the arms extend in a common plane and the rotary element is rotatable about an axis which is oriented orthogonally to the common plane of the arms. The coupling elements extend substantially parallel to the common plane of the arms. Such an arrangement enables a particularly compact construction of the wheel clamp.

In one embodiment, the rotary element is coupled to an elastic element which is designed such that it applies an elastic force to the rotary element, whereby the movable elements are pulled by the rotary element and the coupling elements in the direction toward the center of the wheel clamp in order to minimize the length of the arms.

In one embodiment, the method of mounting the wheel clamp comprises the steps of first moving the movable elements outward against the elastic force of the elastic element acting on the rotary element, and then moving the movable elements toward the center by the elastic force of the elastic element. This allows particularly simple and secure mounting of the wheel clamp on a wheel.

In one embodiment, the elastic element is formed in a spiral shape around the axis of rotation of the rotary element. In this way, an efficient elastic element with little space requirement can be provided.

In one embodiment, the rotary element has a central portion and at least two rotary element arms and each of the coupling elements is connected to one of the arms. By way of a rotary element formed with rotary element arms, it is possible to realize, with little material usage, a mechanical translation in order to enlarge the distances over which the movable elements move when the rotary element is rotated by a predetermined angle.

In one embodiment, the coupling elements are each pivotably connected to the rotary element and the movable elements in order to enable an efficient transmission of force from the rotary element to the movable elements.

In one embodiment, the wheel clamp has three arms that allow the wheel clamp to be securely attached to a wheel.

An exemplary embodiment of a wheel clamp according to the invention will be described in more detail below with reference to the accompanying drawings.

DESCRIPTION OF THE FIGURES

Figure 1:
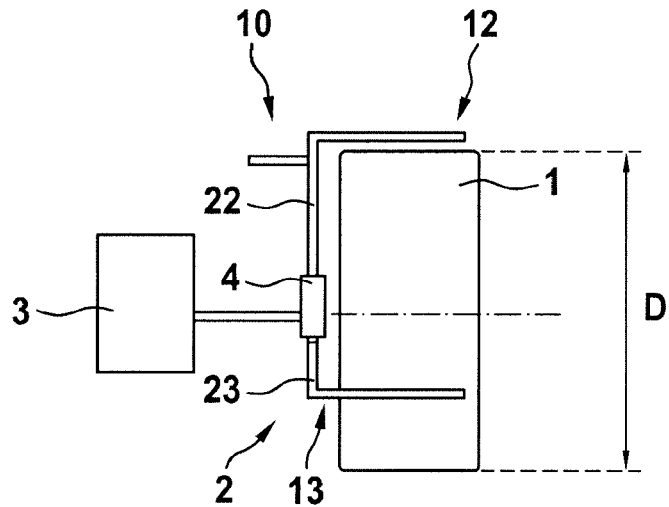
FIG. 1 shows a schematic representation of a wheel with a wheel clamp attached to the wheel.

FIG. 1 shows a schematic representation of a wheel 1 together with a wheel clamp 2 which is mounted on the wheel 1 and has a target 3 attached thereto.

Figure 2:
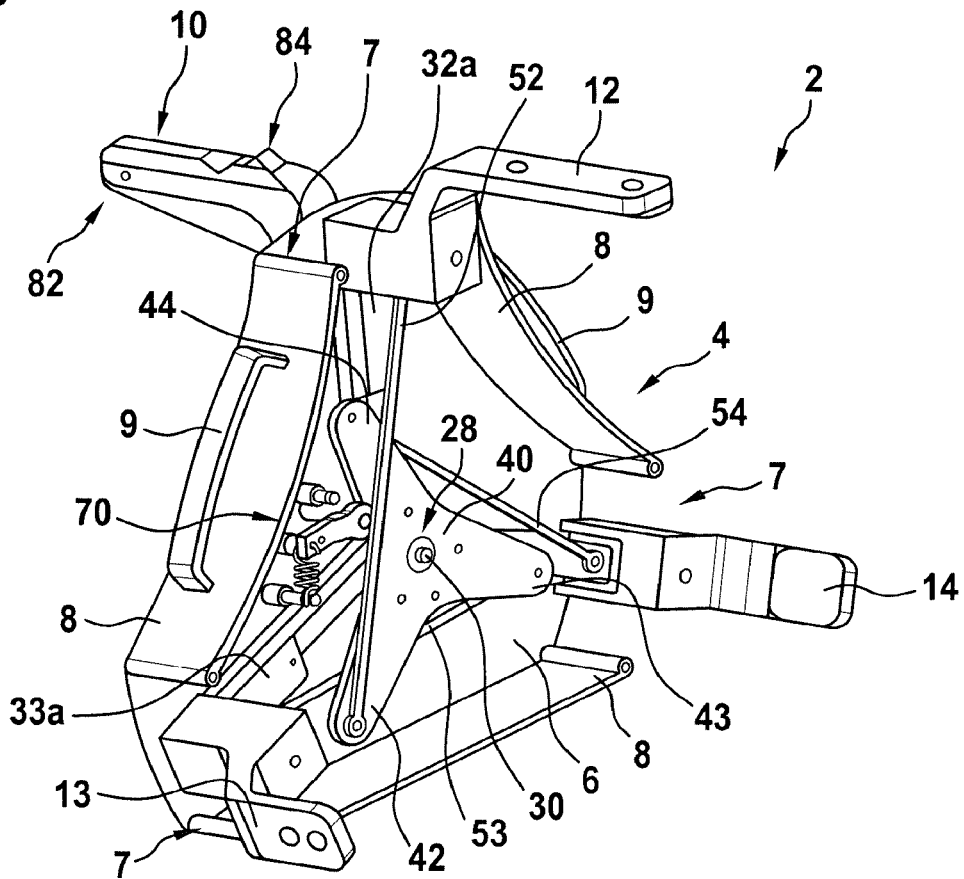
FIGS. 2 and 3 each show a perspective view of a wheel clamp according to an embodiment of the invention.
Figure 3:
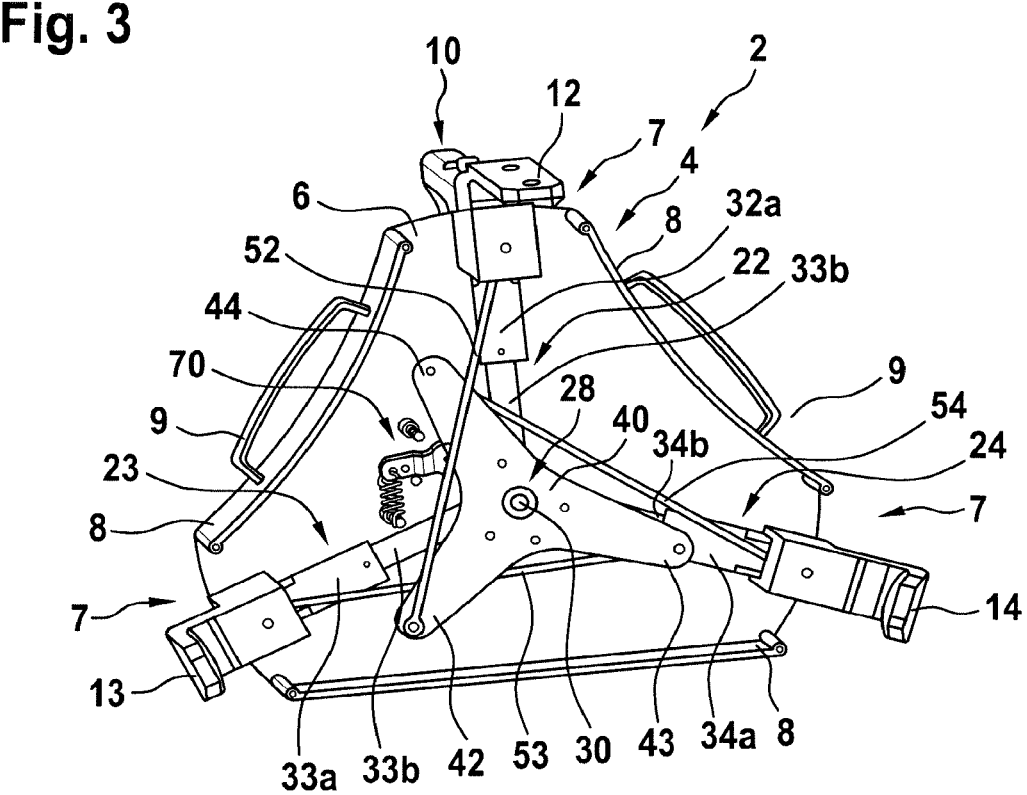

FIGS. 2 and 3 each show a perspective view of a wheel holder or wheel clamp 2 according to an exemplary embodiment of the invention.

The wheel clamp 2 comprises a housing 4 having a base plate 6 and three side walls 8 which extend orthogonally from the edges of the base plate 6 in the same direction. The wheel clamp 2 has several carrying handles 9, 10 facilitating handling of the wheel clamp 2.

A central axis 30 extends orthogonally to the base plate 6 through a central portion (center) 28 of the base plate 6. Three arms 22, 23, 24 extend radially outward from the center 28 of the base plate 6 through openings 7 formed between the side walls 8. The arms 22, 23, 24 extend substantially parallel to the plane of the base plate 6.

The arms 22, 23, 24 each comprise a stationary inner element 32b, 33b, 34b close to the center and a movable outer element 32a, 33a, 34a which is displaceable in the radial direction along the respective inner element 32b, 33b, 34b. The length of the arms 22, 23, 24 in the radial direction can thus be varied by moving, in particular sliding, the outer elements 32a, 33a, 34a along the inner elements 32b, 33b, 34b.

At the outer ends of the outer elements 32a, 33a, 34a facing away from the central axis 30, claws 12, 13, 14 are formed which extend substantially at right angles to the arms 22, 23, 24. The claws 12, 13, 14 are designed to rest on the tread surface of a wheel 1, not shown in FIGS. 2 and 3, when the wheel clamp 2 is attached to a wheel 1 (see FIG. 1).

By moving the outer elements 32a, 33a, 34a outward in the radial direction, the length of the arms 22, 23, 24 can be extended so that the wheel clamp 2 can be easily attached to the wheel 1 in the axial direction of the wheel 1. By moving the outer elements 32a, 33a, 34a inwardly, the arm lengths can be shortened in order to fix the wheel clamp 2 to the wheel 1, as shown in FIG. 1.

A wheel clamp 2 according to an exemplary embodiment of the invention comprises furthermore a central rotary element 40 which is attached on the central axis 30 in the center 28 of the base plate 6 such that it can be rotated about the central axis 30. The rotary element 40 extends in a plane which is oriented substantially parallel to the plane of the base plate 6.

Each of the movable elements 32a, 33a, 34a is connected to the rotary element 40 by a respective coupling element 52, 53, 54. The coupling elements 52, 53, 54 are each movably connected to the rotary element 40 and the movable elements 32a, 33a, 34a so that the coupling elements 52, 53, 54, with respect to the rotary element 40 and the movable elements 32a, 33a, 34a, are pivotable in a plane extending parallel to the plane of the base plate 6.

The coupling elements 52, 53, 54 transform a rotational movement of the rotary element 40 about the central axis 30 into translational movements of the movable elements 32a, 33a, 34a in the radial direction. The movable elements 32a, 33a, 34a can thus be moved in the radial direction along the inner elements 32b, 33b, 34b by rotating the rotary element 40 about the central axis 30 in order to thus vary the length of the arms 22, 23, 24.

By way of the rotary element 40 and the coupling elements 52, 53, 54, the movable elements 32a, 33a, 34a of the arms 22, 23, 24 are coupled to one another such that all movable elements 32a, 33a, 34a move synchronously with one another when one of the movable elements 32a, 33a, 34a is moved. The diameter of the wheel clamp 2 defined by the distance between the claws 12, 13, 14 can therefore be preset in simple manner by moving one of the movable elements 32a, 33a, 34a so that the wheel clamp 2 can be easily, in particular with just one hand, applied to a wheel 1.

In the exemplary embodiment shown in FIGS. 2 and 3, the coupling elements 52, 53, 54 are designed as coupling rods. The coupling elements 52, 53, 54 may also have a different shape, as long as they fulfill the previously described function of transforming a rotational movement of the rotary element 40 into translational movements of the movable elements 32a, 33a, 34a.

In the exemplary embodiment shown in FIGS. 2 and 3, the rotary element 40 is formed with three rotary element arms (projections) which extend radially outward from a central portion of the rotary element 40 on the central axis 30. The coupling elements 52, 53, 54 are each pivotably connected to one of the outer portions of the rotary element arms. With such a configuration of the rotary element 40, it is possible, with little material usage, to implement a mechanical translation which increases the distance over which the movable elements 32a, 33a, 34a move in the radial direction when the rotary element 40 is rotated about the central axis 30 by a predetermined angle.

However, the rotary element arms/projections of the rotary element 40 shown in the figures are not a necessary feature of the invention. The rotary element 40 may also be in the form e.g. of a round, in particular a circular or elliptical, disk or an angular, e.g. triangular or square, disc.

The rotary element 40 is biased by a rotationally elastic element 60 (see FIG. 4) in such a way that the movable elements 32a, 33a, 34a are pulled "inward" by the coupling elements 52, 53, 54, i.e. in the direction toward the central axis 30. The rotationally elastic element 60 is not visible in FIGS. 2 and 3 as it is arranged between the base plate 6 and the rotary element 40 and is concealed by the rotary element 40.

Figure 4:
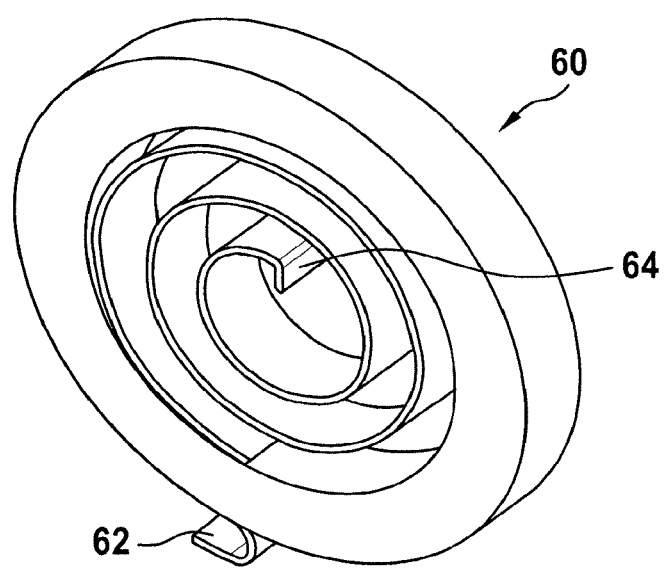
FIG. 4 shows an embodiment of a rotationally elastic element in a perspective schematic representation.

FIG. 4 shows an exemplary embodiment of a rotationally elastic element 60 in a perspective schematic representation.

Figure 5:
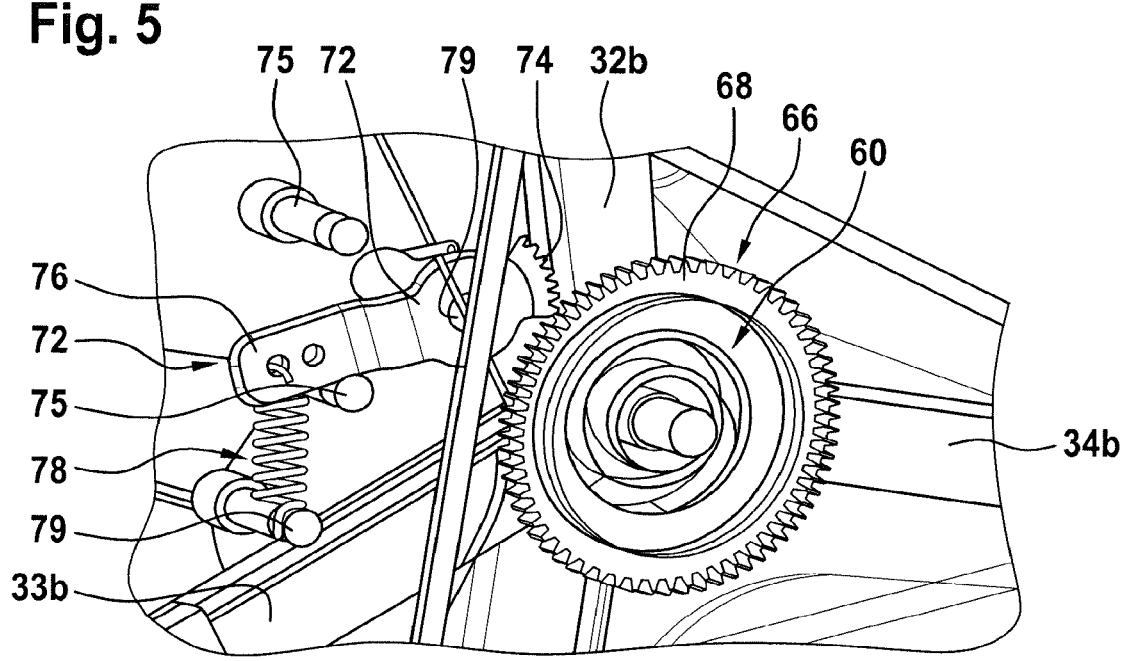
FIG. 5 shows the rotationally elastic element in the installed state.

FIG. 5 shows the rotationally elastic element 60 in the installed state. The rotary element 40 is not shown in FIG. 5 to permit a clear view of the rotationally elastic element 60.

In the exemplary embodiment shown in FIGS. 4 and 5, the rotationally elastic element 60 is in the form of a spiral spring 60 which, starting from the axis 30, extends in a spiral shape outward.

Bent ends 62, 64 of the spiral spring 60 are connected to the rotary element 40 and to the axis 30 or base plate 6, respectively, so that the rotary element 40 tensions and relaxes the spiral spring 60 when it is rotated about the axis 30.

The rotationally elastic element 60 is designed and mounted such that it drives the rotary element 40 in such a way that the movable elements 32a, 33a, 34a are pulled in the direction toward the center 28 by the rotationally elastic element 60. As a result, the length of the arms 22, 23, 24 is minimized, and the wheel clamp 2 is fixed to the wheel 1 by the elastic tensioning force of the rotationally elastic element 60, which is transferred to the claws 12, 13, 14 via the rotary element 40, the coupling elements 52, 53, 54 and the movable elements 32a, 33a, 34a.

The movable elements 32a, 33a, 34a can be moved outward against the force of the rotationally elastic element 60 by muscle power in order to extend the arms 22, 23, 24 so that the wheel clamp 2 can be conveniently attached to the wheel 1 or removed from the same. Due to the elastic force generated by the rotationally elastic element 60, the wheel clamp 2 automatically adapts to different sizes (diameters D) of the wheel 1 in the radial direction within the scope of movement (the maximum path length) of the outer elements 32a, 33a, 34a. A wheel clamp 2 according to the invention thus can be easily attached to wheels 1 of different sizes.

The outer circumference of an annular toothed element 68 surrounding the rotationally elastic element 60 has external teeth 66 formed thereon. The toothed element 68 is non-rotatably connected to the rotary element 40, so that the toothed element 68 and the rotary element 40 can only rotate together about the central axis 30.

Figure 6:
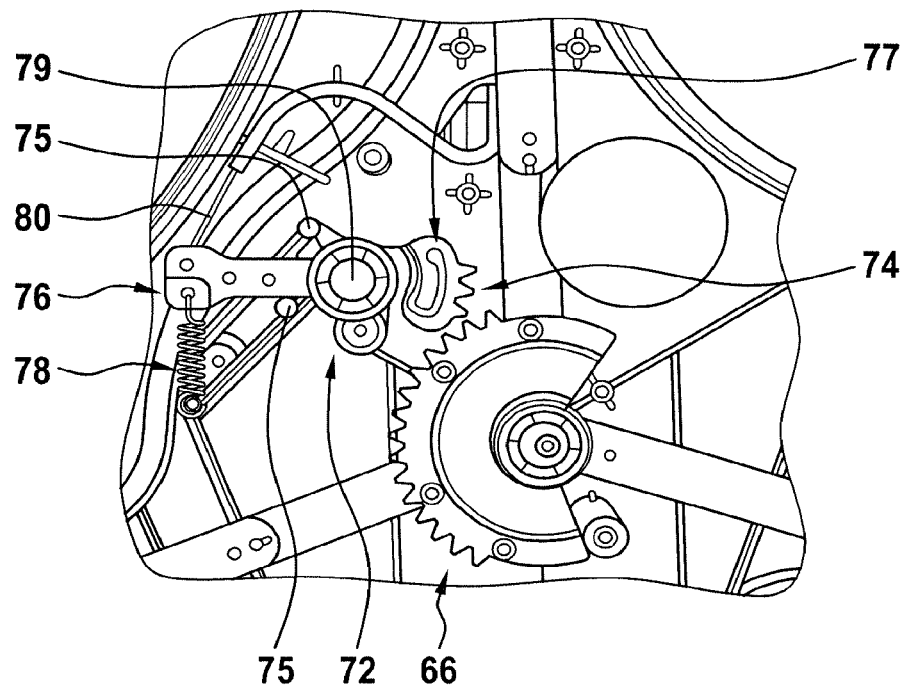
FIG. 6 shows an enlarged view of a locking mechanism according to an embodiment of the invention.

The external teeth 66 may be formed across the entire outer circumference of the toothed element 68 (see FIG. 5) or only across a partial area of the outer circumference of the toothed element 68 (see FIG. 6).

The toothed element 68 with the external teeth 66 is part of a locking device 70 which will be described in more detail in the following with reference to FIGS. 6 and 7.

In addition to the toothed element 68, the locking device 70 comprises a locking mechanism 72 which is pivotably attached to a locking mechanism axis 79 extending orthogonally from the base plate 6 of the wheel clamp 2.

The locking mechanism 72 is pivotable in a plane that is oriented parallel to the base plate 6. The pivoting range of the locking mechanism 72 is limited by two limiting elements (limiting bolts) 75.

At a first end, shown on the right in FIGS. 5 and 6, the locking mechanism 72 comprises a toothed portion 74, the parameters of which correspond to the parameters of the external teeth 66 of the toothed element 68, so that the toothed portion 74 of the locking mechanism 72 can be engaged with the external teeth 66.

At an opposite, second end 76, shown on the left in FIGS. 5 and 6, the locking mechanism 72 is coupled to a first spring element 78. The first spring element 78 is fastened to the base plate 6 via a spring element bolt 79. The first spring element 78 is designed to pull the locking mechanism 72 into the initial position shown in FIGS. 5 and 6.

When the locking mechanism 72 is in the initial position, the toothed portion 74 of the locking mechanism 72 does not engage with the external teeth 66 of the toothed element 68. Consequently, the rotary element 40 can rotate and the outer elements 32a, 33a, 34a coupled to the rotary element 40 are freely movable in the radial direction.

Due to the coupling established by the coupling elements 52, 53, 54 and the rotary element 40, the outer elements 32a, 33a, 34a move synchronously with one another. The distance of the claws 12, 13, 14 from the center, which defines half of the diameter (radius) of the wheel clamp 2, can thus be easily adapted to the diameter D of the wheel 1 to which the wheel clamp 2 is to be attached.

Furthermore, a wire cable (Bowden cable) 80 is mounted on the second end 76 of the locking mechanism 72, which allows pivoting of the locking mechanism 72 about the locking mechanism axis 79, by operating a locking member 82 (see FIGS. 7 and 8), from the initial position shown in FIG. 6 to a locking position in which the toothed portion 74 of the locking mechanism 72 is in engagement with the external teeth 66 of the toothed element 68. This engagement prevents rotation of the rotary element 40. As a result, the outer elements 32a, 33a, 34a of the arms 22, 23, 24, which are coupled to the rotary element 40 by the coupling elements 52, 53, 54, are no longer movable in the radial direction and securely fix the wheel clamp 2 on the wheel 1.

Instead of a wire cable 80, there may also be provided a hydraulic system (not shown in the figures), permitting the locking mechanism 72 to be moved from the initial position into the locking position by actuation of the locking member 82.

Due to a free space 77 formed in the locking mechanism 72 between the toothed portion 74 and the locking mechanism axis 79, the toothed portion 74 is elastic. Due to this elasticity, a tooth of the toothed portion 74, which could lead to blockage in the event of an unfavorable relative positioning of the toothed portion 74 and the external teeth 66, can recede somewhat and slip into an adjacent tooth gap of the external teeth 66. An undesirable blockage between the toothed portion 74 of the locking mechanism 72 and the external teeth 66 of the toothed element 68 can thus be prevented. Blockage between the toothed portion 74 of the locking mechanism 72 and the external teeth 66 could result in the locking mechanism 72 not being able to be pivoted from the initial position into the locking position.

The locking mechanism 72 and the external teeth 66 of the toothed element 68 may be made of metal and/or plastic.

Figure 7:
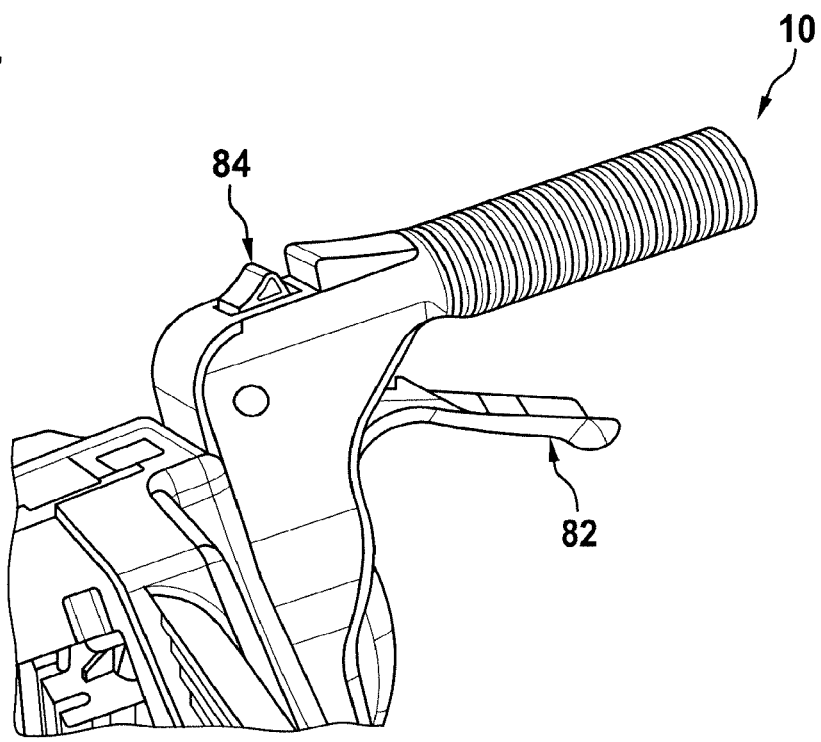
FIG. 7 shows a first embodiment of a locking handle according to an embodiment of the invention.
Figure 8:
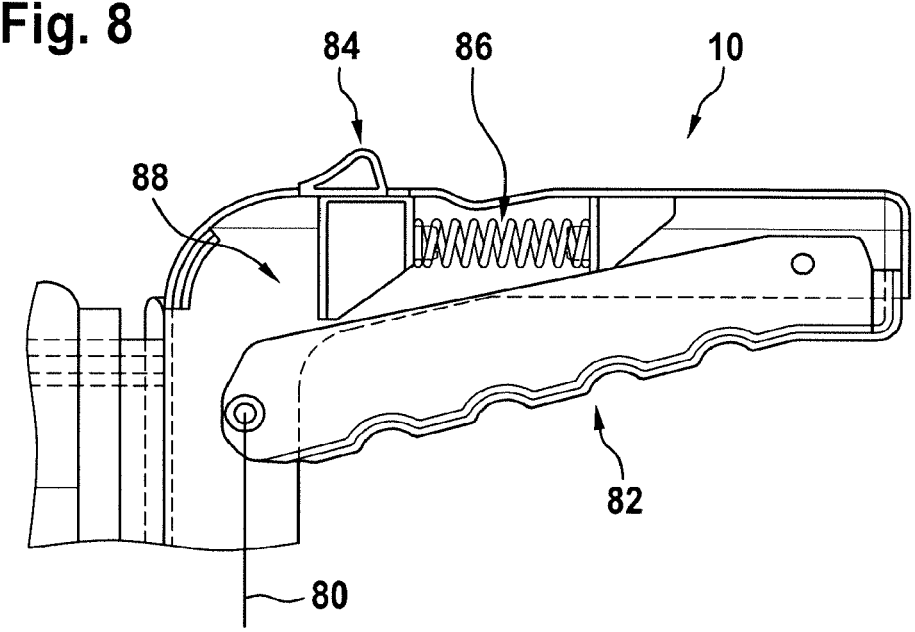
FIG. 8 shows a second embodiment of a locking handle according to an embodiment of the invention.

FIGS. 7 and 8 show two different possible exemplary embodiments of a locking member 82 which is designed to move the locking mechanism 72 on/in a carrying handle 10 of the wheel adapter 2.

In the carrying handle 10 shown in FIG. 8, there is provided a second spring element 86 which is designed to push the locking member 82 into an initial position in which the locking mechanism 72 coupled to the locking member 82 via the wire cable 80 is in its initial position. When the locking mechanism 72 is arranged in its initial position, the toothed portion 74 of the locking mechanism 72 is not in engagement with the external teeth 66 of the toothed element 68.

By actuating (pulling) the locking member 82, the locking mechanism 72 is moved from the initial position into the engaged position via the wire cable 80. In doing so, the toothed portion 74 thereof is engaged with the external teeth 66 of the toothed element 68, whereby additional mechanical tension is applied to the movable outer elements 32a, 33a, 34a and further rotation of the rotary element 40 is prevented in order to securely fasten the wheel clamp 2 to the wheel 1.

By means of a locking member fixing mechanism 88 formed in the carrying handle 10, the locking member 82 can be fixed in the actuated position in which the locking mechanism 72 is in its engaged position. When the locking member 82 is fixed in the actuated position, rotation of the rotary element 40 is prevented by the engagement of the toothed portion 74 of the locking mechanism 72 with the external teeth 66 of the toothed element 68, i.e. the rotary element 40 remains blocked even when the operator's hand is removed from the locking member 82.

By operating an unlocking member 84 formed in the carrying handle 10, the fixation of the locking member 82 can be released in order to thereby release the movable outer elements 32a, 33a, 34a and relax the arms 22, 23, 24, so that the wheel clamp 2 can easily be removed from the wheel 1.

The invention claimed is:

1. A wheel clamp for fastening to a wheel, in particular to a wheel of a motor vehicle, the wheel clamp comprising:
    at least two arms extending outward from a center of the wheel clamp in a radial direction;
    each of the at least two arms having at least one stationary inner element and at least one movable outer element that is movable in the radial direction with respect to the at least one stationary inner element;
    a central rotary element which is arranged rotatably in the center of the wheel clamp; and
    at least two coupling elements each of the at least two coupling elements extending between the at least one movable outer element of one of the at least two arms and the central rotary element such that the at least one movable outer element is movable in the radial direction by rotating the rotary element so that the length of each of the at least two arms in the radial direction is variable by moving the at least one movable outer element of each of the at least two arms;

wherein the rotary element is coupled to an elastic element such that the elastic element applies an elastic force to the rotary element which urges the at least one movable outer element of each of the at least two arms in the direction toward the center of the wheel clamp via the rotary element and the at least two coupling elements; and wherein the elastic element is formed in a spiral shape around an axis of rotation of the rotary element.

2. The wheel clamp according to claim 1,
wherein the at least two arms extend in a common plane and wherein the axis of rotation of the rotary element is oriented orthogonally to the common plane of the at least two arms.

3. The wheel clamp according to claim 2,
wherein the at least two coupling elements extend substantially parallel to the common plane of the at least two arms.

4. The wheel clamp according to claim 1,
wherein the rotary element has a central portion and at least two rotary element arms, each of the at least two coupling elements being connected to one of the at least two rotary element arms.

5. The wheel clamp according to claim 1,
wherein each of the at least two coupling elements is pivotably connected to the rotary element and to the at least one movable outer element of one of the at least two arms.

6. The wheel clamp according to claim 1,
wherein the wheel clamp comprises three arms.

7. A method of mounting a wheel clamp according to claim 1 on a wheel, in particular a wheel of a motor vehicle, the method comprising the steps of:
moving the at least one movable outer element of each of the at least two arms outward in the radial direction in order to increase the arm lengths of the at least two arms;
applying the wheel clamp to a wheel, in particular a wheel of a motor vehicle; and
moving the at least one movable outer element of each of the at least two arms in the direction toward the center of the wheel clamp by rotating the rotary element, so as to fix the wheel clamp to the wheel.

8. The method according to claim 7,
wherein the method comprises moving the at least one movable outer element of each of the at least two arms outward against an elastic force acting on the rotating member; and moving the at least one movable outer element in the direction toward the center of the wheel clamp by the elastic force.

9. The wheel clamp according to claim 2,
wherein the rotary element has a central portion and at least two rotary element arms, each of the at least two coupling elements being connected to one of the at least two rotary element arms.

10. The wheel clamp according to claim 9,
wherein each of the at least two coupling elements is pivotably connected to the rotary element and to the at least one movable outer element of one of the at least two arms.

11. The wheel clamp according to claim 10,
wherein the wheel clamp comprises three arms.

12. The wheel clamp according to claim 3,
wherein the rotary element has a central portion and at least two rotary element arms, each of the at least two coupling elements being connected to one of the at least two rotary element arms.

13. The wheel clamp according to claim 12,
wherein each of the at least two coupling elements is pivotably connected to the rotary element and to the at least one movable outer element of one of the at least two arms.

14. The wheel clamp according to claim 13,
wherein the wheel clamp comprises three arms.

15. The wheel clamp according to claim 2,
wherein each of the coupling elements is pivotably connected to the rotary element and to the at least one movable outer element of one of the at least two arms.

16. The wheel clamp according to claim 2,
wherein the wheel clamp comprises three arms.

17. The wheel clamp according to claim 3,
wherein each of the at least two coupling elements is pivotably connected to the rotary element and to the at least one movable outer element of one of the at least two arms.

18. The wheel clamp according to claim 3, wherein the wheel clamp comprises three arms.

* * * * *